(12) United States Patent
Argue et al.

(10) Patent No.: US 9,076,140 B2
(45) Date of Patent: Jul. 7, 2015

(54) IMAGE EMBEDDING APPARATUS AND METHOD

(75) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 386 days.

(21) Appl. No.: 13/533,826

(22) Filed: Jun. 26, 2012

(65) Prior Publication Data

US 2013/0341417 A1    Dec. 26, 2013

(51) Int. Cl.
*G06K 7/12*      (2006.01)
*G06Q 20/32*    (2012.01)
*G07G 1/01*      (2006.01)
*G07G 3/00*      (2006.01)
*G06Q 20/20*    (2012.01)
*G06Q 20/04*    (2012.01)

(52) U.S. Cl.
CPC .............. *G06Q 20/3274* (2013.01); *G07G 1/01* (2013.01); *G07G 3/00* (2013.01); *G06Q 20/20* (2013.01); *G06Q 20/209* (2013.01); *G06Q 20/0453* (2013.01); *G06Q 20/3276* (2013.01)

(58) Field of Classification Search
CPC .............. G06K 1/00; G06K 17/06037; G06K 19/06028
USPC .......... 235/494, 487, 462.04, 462.08, 462.13, 235/462.15
See application file for complete search history.

(56) References Cited

U.S. PATENT DOCUMENTS

| | | | |
|---|---|---|---|
| 5,471,533 A * | 11/1995 | Wang et al. | 380/51 |
| 5,563,722 A | 10/1996 | Norris | |
| 6,324,545 B1 | 11/2001 | Morag | |
| 7,340,676 B2 | 3/2008 | Geigel | |
| 7,489,324 B2 | 2/2009 | Royal | |
| 7,668,399 B2 | 2/2010 | Sawano | |
| 7,908,547 B2 | 3/2011 | Isomura | |
| 7,974,994 B2 | 7/2011 | Li | |
| 7,983,959 B2 | 7/2011 | Meek et al. | |
| 7,990,564 B2 | 8/2011 | Hanechak | |
| 8,281,334 B2 | 10/2012 | Shan | |
| 2003/0099374 A1* | 5/2003 | Choi et al. | 382/100 |
| 2004/0001133 A1* | 1/2004 | Critelli et al. | 347/101 |
| 2008/0011844 A1* | 1/2008 | Tami et al. | 235/385 |

(Continued)

FOREIGN PATENT DOCUMENTS

EP    0179279    7/1992

*Primary Examiner* — Allyson Trail
(74) *Attorney, Agent, or Firm* — Howard & Howard Attorneys PLLC

(57) ABSTRACT

A method is disclosed for embedding an image during a transaction at a point-of-sale system. The method may include obtaining a first digital image coded to display a call to action and a placeholder occupying a specific position with respect to the call to action. A computer system associated with the point-of-sale system may interpret the first digital image to collect data identifying the specific position of the placeholder. The computer system may obtain a two-dimensional barcode encoded with a transaction identification unique to the transaction. Using the collected data, the computer system may generate a third digital image coded to display the call to action and the two-dimensional barcode. The two-dimensional barcode may occupy the specific position with respect to the call to action. The point-of-sale system may display the third digital image to a customer associated with the transaction via a receipt, a customer-facing screen, or the like.

20 Claims, 8 Drawing Sheets

(56) References Cited

U.S. PATENT DOCUMENTS

| | | | |
|---|---|---|---|
| 2008/0023546 A1* | 1/2008 | Myodo et al. | 235/462.04 |
| 2010/0169767 A1 | 7/2010 | Ishiguro | |
| 2011/0215768 A1* | 9/2011 | Osada | 320/137 |
| 2012/0044515 A1* | 2/2012 | Ikegawa | 358/1.13 |
| 2012/0127501 A1* | 5/2012 | Kobayashi | 358/1.13 |
| 2013/0335440 A1* | 12/2013 | Redpath | 345/592 |
| 2014/0146886 A1* | 5/2014 | Jung et al. | 375/240.12 |

\* cited by examiner

IMAGE EMBEDDING APPARATUS AND METHOD

BACKGROUND

1. Field of the Invention

This invention relates to point-of-sale systems and more particularly to systems and methods for generating customized or unique images for certain transactions effected at point-of-sale systems.

2. Background of the Invention

Many point-of-sale (POS) systems currently in use today do not support important emerging technologies, services, and marketing opportunities. For example, many POS systems are limited in their ability to generate customized or unique images on a transaction-by-transaction basis. As a result, those POS systems cannot implement many novel methods and services that make use of such images. Accordingly, what is needed is an apparatus and method expanding the ability of a wide variety of POS systems, include legacy POS systems, to incorporate customized or unique images.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
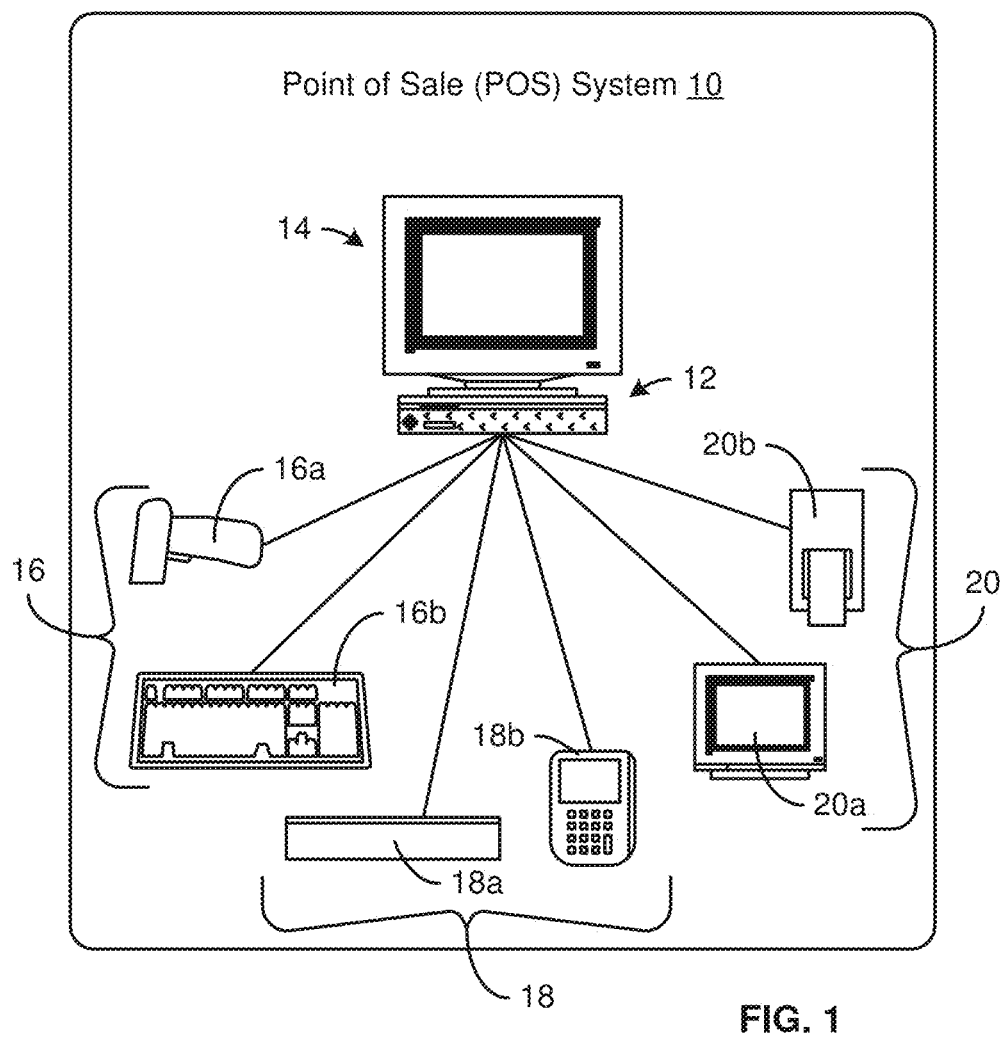
FIG. 1 is a schematic block diagram of one embodiment of a point-of-sale (POS) system for implement methods in accordance with the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for customizing or generating unique images. For example, in selected embodiments, it may be beneficial to display one or more unique graphical or image-based advertisement to a customer via a paper receipt printed by a POS system, a customer-facing display connected to a POS system, or the like.

In selected embodiments, an advertisement may include a call to action inviting or motivating a customer to take a particular step or action. To increase the likelihood that a consumer will respond favorably to the call to action, an advertisement may include a machine-readable code. Upon scanning the code, a consumer may be directed to a desired website or resource, initiate the download of a particular application or resource, or the like.

In certain embodiments, a machine-readable code may comprise a two-dimensional barcode (e.g., a Quick Response (QR) Code). The data encoded within a machine-readable code may vary between different embodiments and different purposes or goals of the advertisement. In selected embodiments, a machine-readable code may encode a transaction identification (ID) uniquely identifying a particular transaction (e.g., purchase, return, or the like). Alternatively, or in addition thereto, a machine-readable code may encode an advertisement ID (e.g., an ID indicating which particular combination of call to action, graphics, or the like accompanied the machine-readable code).

In general, the purpose of an advertisement and the various components thereof may be to benefit, economically or otherwise, a consumer, an entity (e.g., an entity selling goods or services to the consumer), or some combination thereof. For example, in selected embodiments, an advertisement may support or enable storage of transaction data, budgeting, electronic search of transaction data, couponing, shopping lists, electronic backup of transaction data, sharing of transaction data with family, friends, and/or co-workers, tracking of expenses for business or tax purposes, or the like or combinations or sub-combinations thereof. In certain embodiments, one purpose of an advertisement may be to transition a customer from using paper receipts to using electronic (i.e., paperless) receipts. This purpose, as well as others mentioned above, may be furthered by embedding one or more pre-prepared image templates with one or more transaction-specific, machine-readable codes generated at the time of a transaction at a POS system.

For example, a graphic artist or designer may prepare one or more templates long before a particular transaction is initiated at a POS system. Since a machine-readable code may be encoded with transaction-specific information, it may not be included within a template at the time of its original creation. However, the placement of a machine-readable code with respect to the content of a template may be important to the work and goals of the artist or designer. For example, to enable or support flexibility and creativity in the arrangement of templates, the location, size, orientation, etc. of placeholders may not be standardized. Accordingly, the artist or designer may incorporate a placeholder for the machine-readable code within a template. Thus, a system in accordance with the present invention may analyze a template, locate a placeholder therewithin, and generate a unique advertisement by combining elements of the template and machine-readable code (e.g., embedding the machine-readable code in place of the placeholder).

In selected embodiments, a system in accordance with the present invention may include or support an interpretation module. An interpretation module may identify the position of one or more placeholders within a template in any suitable manner. For example, one or more placeholders may be respectively coded for display in one or more particular colors, while all other elements a template may be coded for display in one or more other colors. Accordingly, an interpretation module may "read" a template to identify the data portions thereof that correspond to (e.g., would generate when rendered) pixels of the particular colors. This may be done without actually rendering any pixels or colors on a screen.

Using the data collected by an interpretation module, a system in accordance with the present invention may generate an advertisement. In selected embodiments, the advertisement generated may comprise a digital image formed when an image template is modified such that one or more placeholders therewithin are replaced with one or more machine-readable codes, transaction-specific readable images, transaction-specific non-readable images, or the like. Once generated, an advertisement may be stored within a memory device or collection of memory devices. For example, an advertisement may be passed to the memory of a receipt printer. Alternatively, or in addition thereto, an advertisement may be passed to a customer-facing screen for display thereon.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, in selected embodiments, the hardware, software, or hardware and software of a POS system 10 may be configured to implement one or more methods in accordance with the present invention. For example, a POS system 10 may be manufactured, programmed, modified, or upgraded to support image-embedding capabilities.

A POS system 10 in accordance with the present invention may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 in accordance with the present invention may include an accounting interface to pass certain information to one or more in-house or independent accounting applications.

Figure 2:
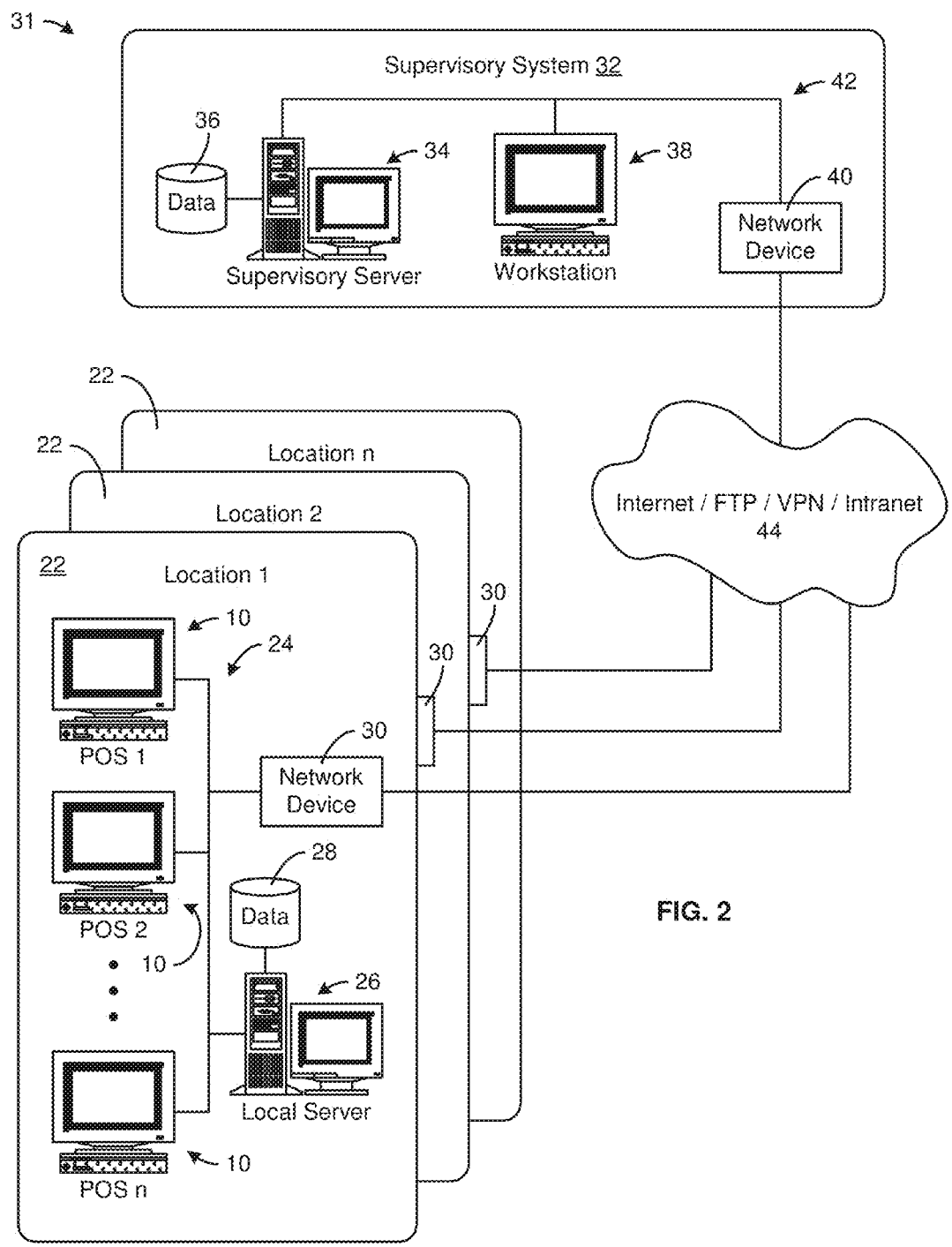
FIG. 2 is a schematic block diagram of one embodiment of multiple POS systems in accordance with the present invention operating in the context of an enterprise-wide system.

Referring to FIG. 2, in selected embodiments, a POS system 10 may operate substantially independently, as a stand-alone unit. Alternately, a POS system 10 in accordance with the present invention may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 in accordance with the present invention may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

Figure 3:
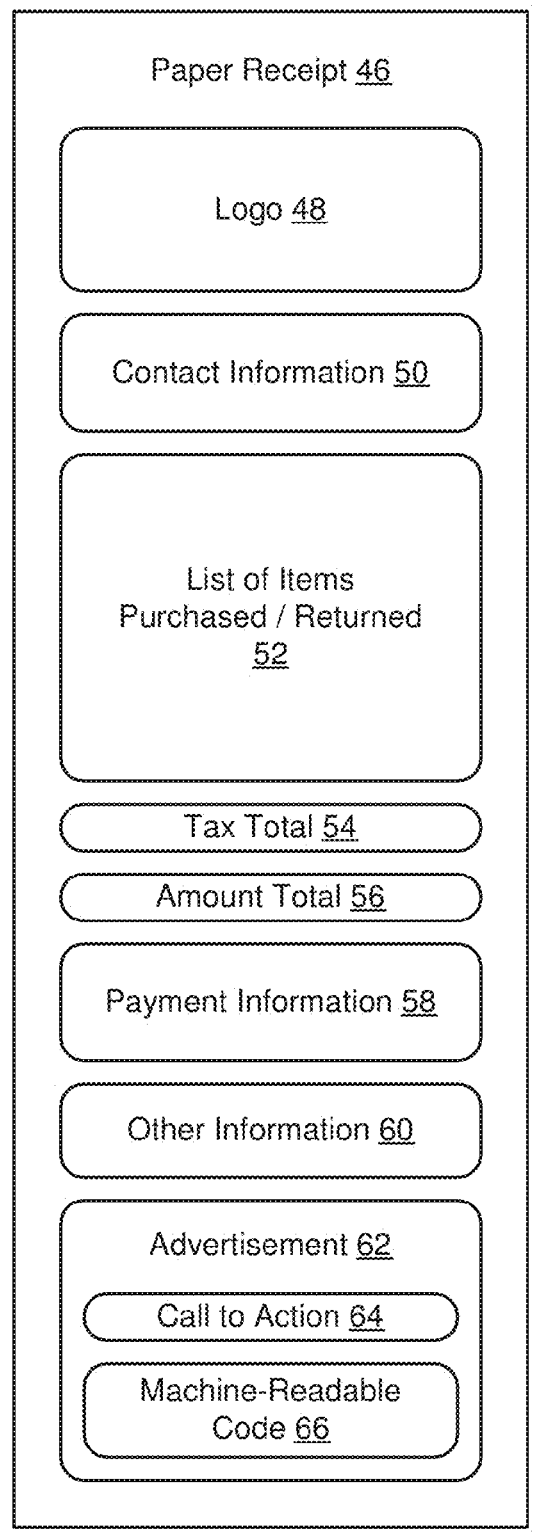
FIG. 3 is a schematic block diagram of one embodiment of receipt in accordance with the present invention.

Referring to FIG. 3, in selected embodiments in accordance with the present invention, a POS system 10 may output a receipt 46. For example, a printer 20b of a POS system 10 may output a paper receipt 46. A receipt 46 may perform various functions. Primarily, a receipt 46 may document a financial transaction (e.g., sale or return). However, a receipt 46 may also deliver one or more marketing messages to a consumer. In selected embodiments, a receipt 46 may include a logo 48, contact information 50, a list 52 of items purchased or returned, a total 54 indicating the sales tax assessed or returned, a total 56 indicating 56 the amount paid or returned, payment information 58, other information 60, or the like or combinations or sub-combinations thereof.

A logo 48 may reinforce the brand and image of the associated entity within the mind of a consumer. By including contact information 50 on a receipt 46, an entity may ensure that a customer has ready access to one or more physical addresses, Internet address, telephone numbers, facsimile numbers, hours of operation, or the like or combinations or sub-combinations thereof. One or more of a list 52 of items purchased or returned, a total 54 indicating the sales tax assessed or returned, a total 56 indicating 56 the amount paid or returned, and payment information 58 (e.g., date of transaction, an indication of method of payment, an indication of which credit or debit card was used, etc.) may be included to document important details of a transaction.

Other information 60 may be included within a receipt 46 as desired or necessary. For example, to promote brand loyalty, an entity may include an indication of an amount saved in the transaction, a yearly total of the amount saved, reward points earned, or the like. Alternatively, or in addition thereto, other information 60 may include promotional information, a solicitation to participate in a survey, an employment opportunity, contest information, or the like.

In selected embodiments, a receipt 46 may include an advertisement 62. An advertisement 62 may include a call to action 64 inviting or motivating a recipient of the receipt 46 to take a particular step or action. For example, a call to action 64 may invite or motive a consumer to visit a particular website, download a particular application, or the like. To increase the likelihood that a consumer will respond favorably to the call to action 64, an advertisement 62 may include an enabler facilitating the desired step or action. For example, in selected embodiments, an advertisement 62 may include a machine-readable code 66. Upon scanning the code 66 (e.g., scanning the code 66 using a camera on a mobile computing device such as mobile telephone, personal digital assistant (PDA), or tablet computer or reader, or the like), a consumer may be directed to a desired website (e.g., a particular URL), initiate the download of a particular application, initiate the download of a resource corresponding to a transaction (e.g., an electronic receipt), or the like.

A machine-readable code 66 may comprise a barcode. For example, in certain embodiments, a machine-readable code 66 may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

The data encoded within a machine-readable code 66 may vary between different embodiments and different purposes (e.g., purposes or goals of an advertisement 62). In selected embodiments, a machine-readable code 66 may encode a transaction identification (ID). A transaction ID may uniquely identify a particular transaction (e.g., a transaction documented by a corresponding receipt 46). Alternatively, or in addition thereto, a machine-readable code 66 may further encode an advertisement ID (e.g., an ID indicating which particular combination of call to action 64, graphics, or the like accompanied the machine-readable code 66). A machine-readable code 66 may also encode a web address or URL.

As with a machine-readable code 66, the nature or characteristics of an advertisement 62 and call to action 64 may vary according to a purpose thereof. In general, the purpose of an advertisement 62 and the various components 64, 66 thereof may be to benefit, economically or otherwise, a consumer, an entity (e.g., an entity issuing the receipt 46), or some combination thereof. For example, in selected embodiments, the purpose of an advertisement 62 may be to transition a customer from using paper receipts 46 to using electronic (i.e., paperless) receipts.

At one level, the use of electronic receipts may conserve natural resources by reducing the need for and consumption of paper. However, the use of electronic receipts may have other advantages to both a consumer and an entity issuing the electronic receipts. For example, electronic receipts may enable a consumer to more easily collect and keep a highly detailed record of his or her spending. Entities issuing electronic receipts may benefit from additional marketing opportunities that the electronic receipts provide.

Figure 4:
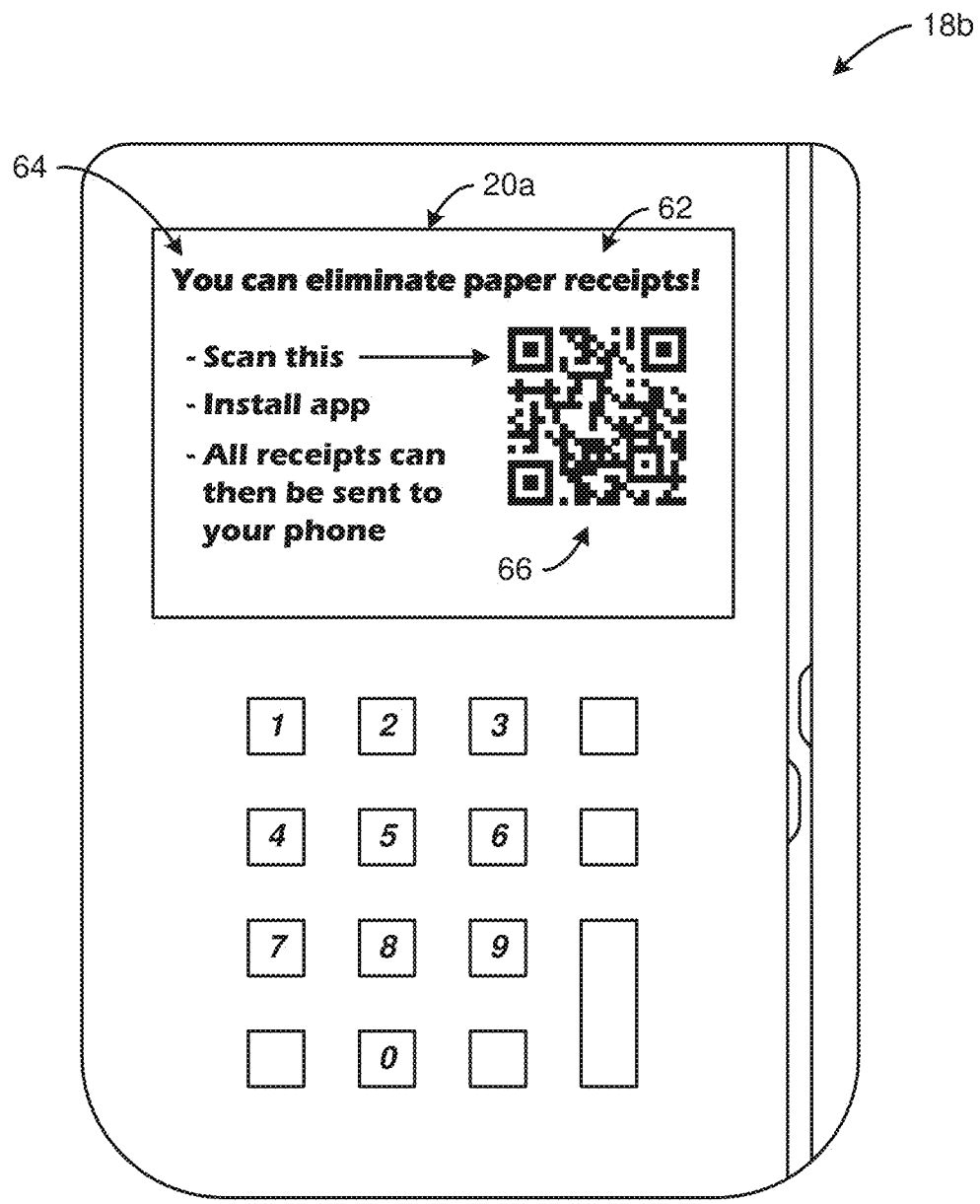
FIG. 4 is an illustration showing how a card reader (e.g., credit card reader, debit card reader) may be used as a customer-facing display in certain embodiments in accordance with the present invention.
Figure 5:
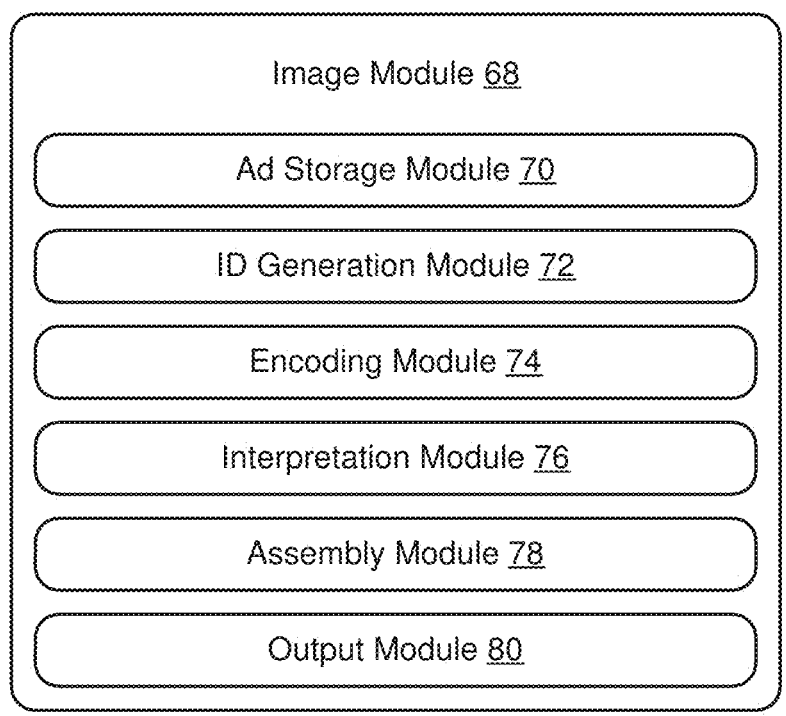
FIG. 5 is a schematic block diagram of one embodiment of an image module in accordance with the present invention.
Figure 6:
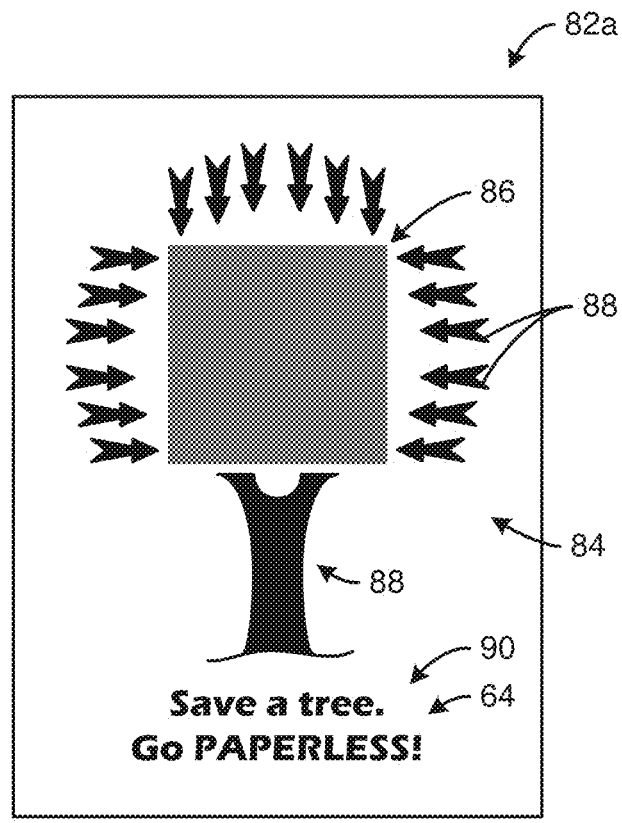
FIG. 6 is an illustration of one embodiment of a template displaying first content and a placeholder in accordance with the present invention.
Figure 7:
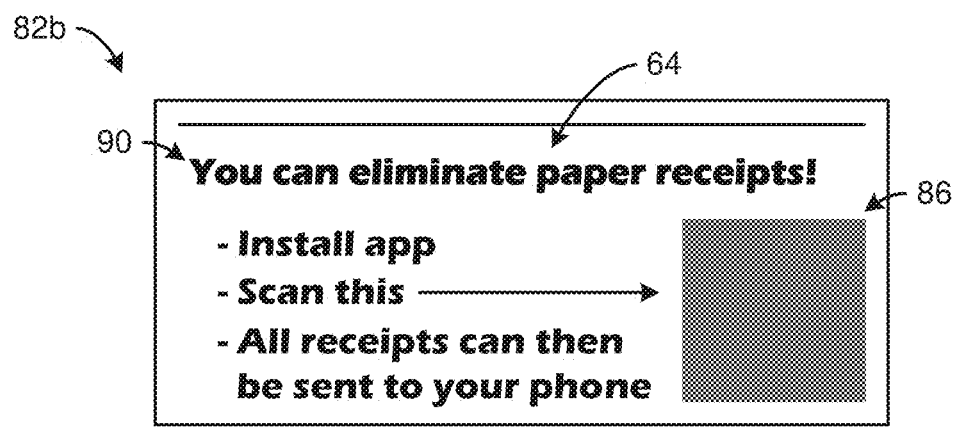
FIG. 7 is an illustration of an alternative embodiment of a template displaying first content and a placeholder in accordance with the present invention.
Figure 8:
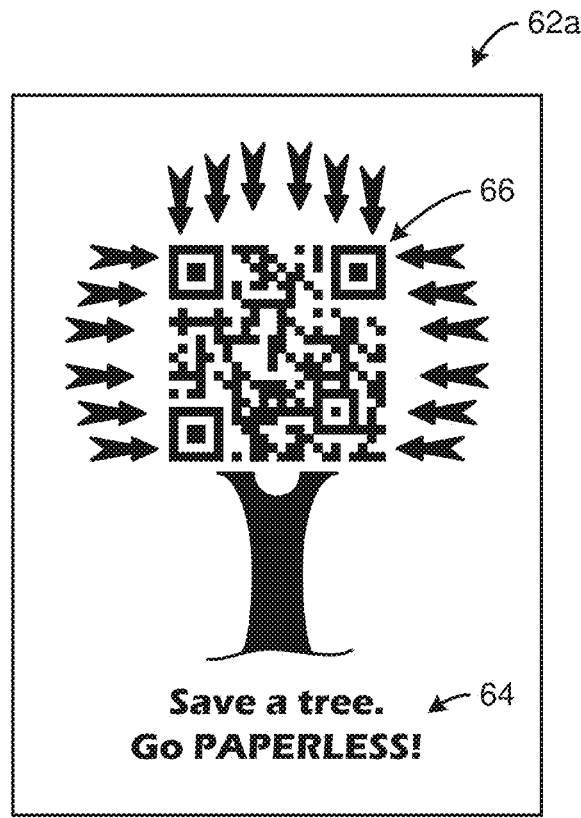
FIG. 8 is an illustration of one embodiment of the template of FIG. 6 converted to an advertisement in accordance with the present invention.
Figure 9:
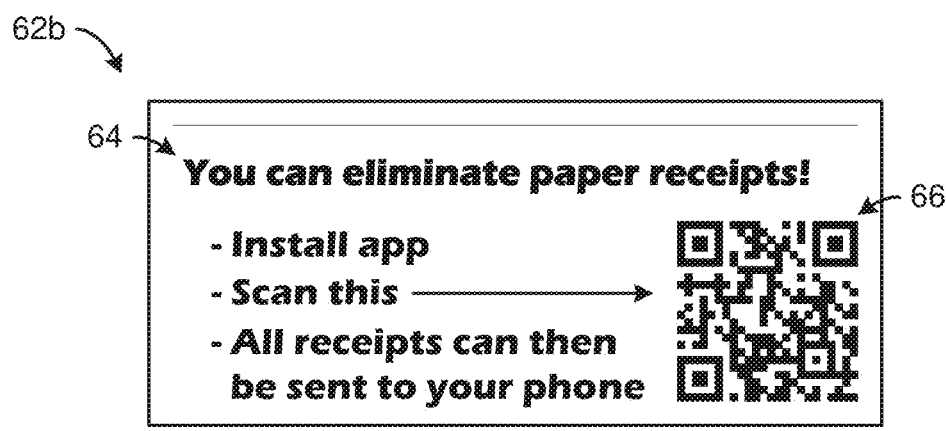
FIG. 9 is an illustration of one embodiment of the template of FIG. 7 converted to an advertisement in accordance with the present invention.

Referring to FIG. 4, as set forth hereinabove, an advertisement 62 may be presented to a customer via a printed receipt 46. Alternatively, or in addition thereto, an advertisement 62 (e.g., the same advertisement 62 or a different advertisement 62) may be presented to a customer via some other output mechanism 20. For example in selected embodiments, one or more advertisements 62 may be presented to a customer via a customer-facing display 20*a* or screen 20*a*.

A customer-facing display 20*a* may take various forms. In selected embodiments, a customer-facing display 20*a* may be embodied as a stand-alone monitor dedicated to presenting information, advertisements 62, or the like to a customer at a POS. Alternatively, a customer-facing display 20*a* may be a multi-use screen capable of performing various functions. For example, in certain embodiments, a customer-facing display 20*a* may be embodied as a screen on a card reader 18*b*. That is, during at least some portion of a transaction, an advertisement 62 may be displayed on a screen or a portion of a screen of a card reader 18*b*.

Referring to FIGS. 5-9, in general, consumers rely heavily on visual cues. Accordingly, an advertisement 62 may include a significant graphical component. That is, an advertisement 62 in accordance with the present invention may impact a consumer through images, stylization, or the like, rather than just through plain text. Thus, in certain embodiments, some portion or all of an advertisement 62 may be passed within a POS system 10 as an image and printed or displayed as an image, not as text. For example, an advertisement 62 (or a significant portion thereof) may be passed to a receipt printer 20*b* or customer-facing display 20*a* in a stream including a raster-coded image or bitmap.

In selected embodiments, an image module 68 may be tasked with obtaining or generating one or more images associated with an advertisement 62. For example, an image module 68 may obtain, generate, and/or assemble one or more advertisements 62 and deliver the one or more advertisements 62 to a receipt printer 20*b*, customer-facing display 20*b*, or the like or some combination thereof. An image module 68 may include any suitable arrangement of sub-components or modules. In certain embodiments, an image module 68 may include a storage module 70, ID generation module 72, encoding module 74, interpretation module 76, assembly module 78, and output module 80, or the like or some combination or sub-combination thereof.

A storage module 70 may enable an image module 68 to receive, store, index, and/or retrieve one or more images. For example, in certain embodiments, a storage module 70 may provide or support the receiving, storing, indexing, and/or retrieving of one or more image templates 82 (e.g., first and second templates 82*a*, 82*b*). An image template 82 may be an image (e.g., a digital image, raster-coded image, bitmap, or the like) coded to display some content 84 and one or more placeholders 86.

The content 84 of an image template 82 may have any suitable form. In selected embodiments, the content 84 of a template 92 may include one or more graphical elements 88 (e.g., non-readable elements, shapes, icons, illustrations, or the like), one or more readable elements 90 (e.g., stylized text or a written call to action 64 in image form), or the like or some combination or sub-combination thereof. A placeholder 86 of an image template 82 may correspond to, and provide, a space for a machine-readable code 66, transaction-specific image, or the like.

That is, one or more templates 82 may be prepared and stored in memory (e.g., some memory device or collection of memory devices within a POS system 10, location 22, or enterprise-wide system 31) before a transaction at a POS system 10 is initiated. For example, a graphic artist or designer may prepare one or more templates 82 highlighting different messages, themes, or the like applicable to different situations or transactions long before a particular transaction is initiated at a POS system 10. Since a machine-readable code 66 may be encoded with transaction-specific information, it may not be included within a template 82 at the time of its original creation.

However, the placement (e.g., location, size, orientation, etc.) of a machine-readable code 66 or other transaction-specific image with respect to the content 84 may be important to the work and goals of the artist or designer. Accordingly, the artist or designer may incorporate one or more placeholders 86 within a template 82. The location, size, and orientation of a placeholder 86 may respectively indicate the desired location, size, and orientation of the machine-readable code 66, transaction-specific image, or the like in the final product (e.g., the final image presented to a customer).

An ID generation module 72 may generate one or more identifications to be incorporated within an advertisement 62. For example, an ID generation module 72 may obtain or generate an ID unique to each transaction processed within a POS system 10, location 22, or enterprise-wide system 31. Alternatively, or in addition thereto, an ID generation module 72 may obtain or generate an ID for each advertisement 62 processed within a POS system 10, location 22, or enterprise-wide system 31.

An encoding module 74 may generate a machine-readable code 66 encoded with various data, including a transaction ID, advertisement ID, uniform resource identifier (URI), or the like or some combination or sub-combination thereof. In selected embodiments, a machine-readable code 66 may be embodied as a digital image coded to display content that is machine-readable. For example, in certain embodiments, a machine-readable code 66 may be embodied as a digital image coded to display a QR Code of the like. Once generated, a machine-readable code 66 may be stored within a memory device or collection of memory devices corresponding to a POS system 10, location 22, enterprise-wide system 31, or some other resource.

An interpretation module 76 may analyze or interpret one or more image templates 82 to collect data characterizing the position of one or more placeholders 86 therewithin. To enable or support flexibility and creativity in the arrangement of templates 82, the location, size, orientation, etc. of placeholders 86 may not be standardized. For example, one template 82a may have a placeholder 86 in a central location, while another template 82b may have a placeholder 86 shifted to one side. Accordingly, an interpretation module 76 may be responsible for collecting data characterizing one or more of the location, size, orientation, etc. of one or more placeholders 86 within one or more templates 82.

An interpretation module 76 may identify the position of a placeholder 86 in any suitable manner. The operation of an interpretation module 76 may depend to a certain degree on the nature of a digital image forming the template 82. In selected embodiments, an image template 82 may be coded to display a placeholder as a contiguous patch (e.g., square, rectangle, circle, regular polygon, or the like) of pixels having a particular color not found elsewhere in the image template 82.

For example, a placeholder 86 may be coded for display in red (e.g., hexadecimal code #FF0000), while all other elements 88, 90 of the image template 82 may be coded for display in black (e.g., hexadecimal code #000000). Accordingly, in certain embodiments, an interpretation module 76 may analyze or interpret an image template 82 and identify which pixels correspond to the particular color.

An interpretation module 76 may analyze or interpret an image template 82 in a systematic manner until sufficient information regarding the position of one or more placeholders 86 has been obtained. In selected embodiments, an interpretation module 76 may progressively analyze or interpret the pixels of an image template 82 row-by-row, column-by-column, or the like. For example, an interpretation module 76 may scan an image template 82 by first analyzing or interpreting a first row of pixels corresponding thereto. If insufficient data is collected from the first row, the interpretation module 76 may progress to an adjacent second row. This process may continue until the "metes and bounds" of a placeholder 86 have been concretely identified.

The amount of data collected or processing performed by an interpretation module 76 may vary been embodiments or between templates 82. In selected embodiments, only one placeholder 86 may be permitted per image template 82. Additionally, the orientation of the placeholder 86 may match that of the corresponding template 82. For example, both the placeholder 86 and the template 82 may be rectangular and respective sides or edges may be parallel to one another. In such situations or embodiments, an interpretation module 76 may merely need to identify the first string of pixels (e.g., row or column portion) corresponding to the placeholder 86 to concretely establish the position of the one placeholder 86 within the template 82.

That is, the first string may indicate a "starting" corning for the placeholder 86 as well as the orientation of the placeholder 86. The length of the first string may indicate the scale of the placeholder 86. More data, row or column scans or interpretations, or the like may be needed when the orientation of a placeholder 82 does not match that of the corresponding template 82.

The scanning performed by an interpretation module 76 may be non-optical. That is, an image template 82 may be interpreted without actually being rendered on a screen. An interpretation module 76 may decode an image (e.g., template 82) to memory to enable pixel-by-pixel analysis. Accordingly, an interpretation module 76 may identify pixels fitting a specific pattern (e.g., a pattern indicating that one or more pixels form part of a placeholder 86). For example, an interpretation module 76 may identify one or more pixels having a red component above a first threshold and blue and green components below a second threshold. Thus, an interpretation module 76 may "read" an image template 76 to identify the data portions thereof that correspond to (e.g., would generate) pixels of certain colors, without actually rendering any pixels or colors on a screen.

Using the data collected by an interpretation module 76, an assembly module 78 may generate an advertisement 62. In selected embodiments, the advertisement 62 generated may comprise a digital image formed when an image template 82 is modified such that one or more placeholders 86 therewithin are respectively replaced with one or more machine-readable codes 66, transaction-specific images (e.g., non-readable images or readable images displaying timestamps, dates, website information (URL), etc.), or the like or combinations or sub-combinations thereof. For example, the data collected by an interpretation module 76 may identify which data portions of an image template 82 corresponding to a placeholder 86. An assembly module 78 may create a new digital image wherein those data portions (e.g., certain values with those data portions) have been modified, coded, or recoded to present a particular machine-readable code 66, transaction-specific image, etc. rather than the placeholder 86.

Since a machine-readable code 66 may be unique to the transaction at hand, the one or more advertisements 62 generated by an assembly module 78 may each be unique. For example, a unique machine-readable code 66 may be embedded within a first template 82a to create a first unique advertisement 62a. Similarly, the unique machine-readable code 66 may be embedded within a second template 82b to create a second unique advertisement 62b.

Once generated, an advertisement 62 may be stored within a memory device or collection of memory devices corresponding to a POS system 10, location 22, enterprise-wide system 31, or some other resource. For example, in selected embodiments, an output module 74 may pass an advertisement 62 to the memory of a receipt printer 20b. Alternatively, or in addition thereto, an advertisement 62 may be passed to or read by a customer-facing screen 20a for display thereon.

The various functions or modules of an image module 68 may be enacted or implemented by any suitable system or component thereof. For example, in selected embodiments, an image module 68 may be implemented partially or entirely as a "virtual printer" or monitor driver residing on a primary computer 12 of a POS system 10. Alternatively, one or more functions or modules of an image module 68 may be enacted or implemented by a "box" positioned in the line of communication between a primary computer 12 and a receipt printer 20b or between a primary computer 12 and a customer-facing display 20a. A box may monitor and modify certain communications passing between the computer 12 and the printer 20b or display 20a. A box may access a LAN 24 or WAN 44 to gather additional resources or information as necessary.

In still other embodiments, one or more functions or modules of an image module 68 may be distributed across various hardware devices, including a primary computer 12 of a POS system 10, a local server 26, a supervisory server 34, an onsite resource, an offsite resource, or the like or combinations or sub-combinations thereof. Thus, systems and methods in accordance with the present invention may be adapted to a wide variety of situations, including more rigid legacy systems.

Figure 10:
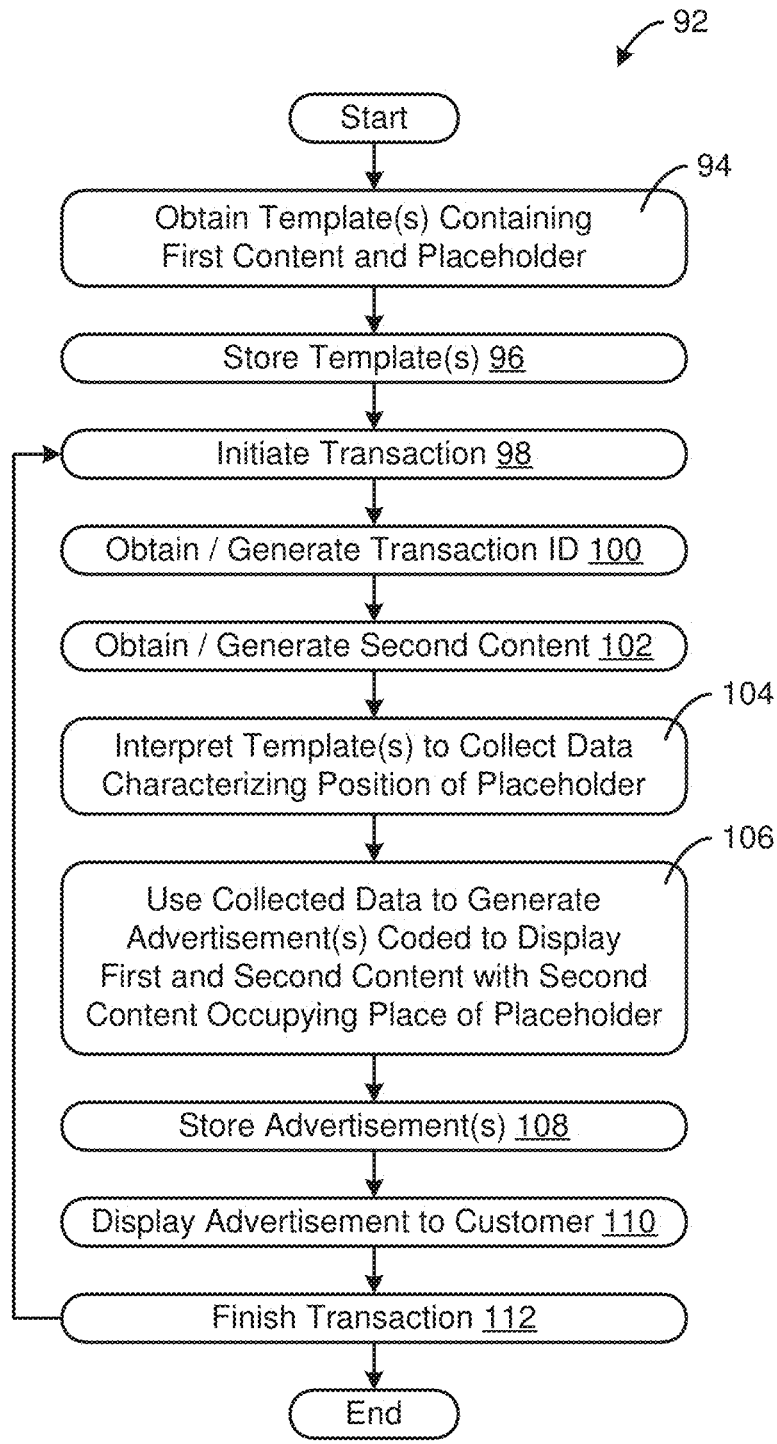
FIG. 10 is a block diagram of one embodiment of a method for customizing or embedding images in accordance with the present invention.

Referring to FIG. 10, in certain embodiments, a method 92 in accordance with the present invention may begin when one or more templates 82 (e.g., first digital images) are obtained 94 and stored 96 in memory. Each such template 82 may be a digital image coded to display first content and a placeholder occupying a specific position with respect to the first content. In selected embodiments, the first content may comprise one or more graphical elements 88, readable elements 90, calls to action 64, or the like or some combination thereof. A placeholder 86 may be coded within a template 82 to be displayed as a contiguous patch of pixels having a color not found in the first content.

Next, a transaction (e.g., a purchase, return, or the like) may be initiated 98 at a POS system 10. After initiation 98, various transaction-related tasks may be performed. The nature of such tasks may depend on the nature of the transaction. For example, if the transaction is a purchase of a plurality of items, the tasks performed may include scanning the items, bagging the items, calculating various amounts (e.g., amount of discount, amount of tax due, total amount due), receiving payments (e.g., receiving and counting a cash payment, processing a credit or debit card payment), performing some other task, or the like or some combination or sub-combination thereof.

Meanwhile, at the same time the transaction-related tasks are being performed, various steps or actions may be taken with respect to an advertisement 62. For example, after initiation 98, a transaction ID unique to the transaction may be obtained 100 or generated 100. A second digital image coded to display second content may be obtained 102 or generated 102. In selected embodiments, a second digital image may be a machine-readable code 66 coded to include the transaction ID. For example, a second digital image may be generated 102 that is coded to display a two-dimensional barcode encoded with the transaction ID.

One or more templates 82 may be interpreted 104 to collect data characterizing the position (e.g., location, size, orientation, etc.) of one or more placeholders 86 therewithin. Using 106 this collected data, one or more advertisements 62 may be generated. Each advertisement 62 may comprise a third digital image coded to display the first and second content. The second content (e.g., the machine-readable code 66) may be coded to occupy with respect to the first content the position previously occupied by a placeholder 86. Once this assembly 106 or embedding 106 has been accomplished, the completed advertisements 62 may be stored 108 in memory. Thus, for many if not all transactions, a new advertisement 62 or plurality of new advertisements 62 may be stored 108 before all the transaction-related tasks have been performed.

Once the transaction-related tasks have been performed (or, alternatively, while they are being performed), one or more advertisements 62 may be displayed 110 to a customer corresponding to the transaction. For example, one or more advertisement 62 may be printed 110 on a receipt 46. Alternatively, or in addition thereto, one or more advertisement 62 may be displayed 110 on a customer-facing display 20a. The transaction may then be completed 112 or finished 112. Accordingly, a new or subsequent transaction may be initiated 98 and the method 92 may be repeated in whole or in part for another transaction.

The flowchart and block diagrams in FIG. 10 illustrate the architecture, functionality, and operation of possible implementations of systems, methods, and computer program products according to one embodiment of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. For example, in the illustration, the interpretation 104 of a template 82 occurs after a new transaction has been initiated 98 and a transaction ID has been obtained 100 or generated 100. However, the interpretation 104 may occur at some other time. For example, the interpretation 104 may occur after one or more templates 82 have been obtained 94 and before a transaction has been initiated 98.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for embedding an image, the method comprising:
   obtaining a first digital image coded to display first content and a placeholder occupying a specific position with respect to the first content;
   storing, within a computer memory system, the first digital image;
   interpreting, by a computer processing system operably connected to the computer memory system, the first digital image to collect data identifying the specific position of the placeholder with respect to the first content;
   obtaining a second digital image coded to display second content;
   using, by the computer processing system, the data to generate a third digital image coded to display the first content and the second content conspicuously, the second content occupying the specific position with respect to the first content; and
   storing, within the computer memory system, the third digital image.

2. The method of claim 1, wherein the obtaining of the first digital image comprises obtaining the first digital image coded to display the placeholder as a contiguous patch of pixels having a color not found in the first content.

3. The method of claim 2, wherein the interpreting comprises systematically reviewing the first digital image to identify at least one of the location, scale, and orientation of the contiguous patch of pixels.

4. The method of claim 3, wherein the using comprises systematically altering the first digital image to convert certain values corresponding to the contiguous patch of pixels from the color to the second content.

5. The method of claim 4, wherein the storing of the first digital image comprises storing the first digital image using raster coding.

6. The method of claim 5, wherein the storing of the third digital image comprises storing the third digital image using raster coding.

7. The method of claim 6, wherein the storing of the third digital image further comprises storing the third digital image in memory of a printer of a point-of-sale system.

8. The method of claim 7, further comprising printing, by the printer, the third image on a receipt documenting a transaction performed at the point-of-sale system.

9. The method of claim 8, wherein the obtaining the second digital image comprises obtaining the second digital image coded to display a two-dimensional barcode as the second content.

10. The method of claim 9, wherein the first content includes a call to action related to scanning the two-dimensional barcode.

11. The method of claim 10, wherein the obtaining the second digital image further comprises obtaining the second digital image coded to display the two-dimensional barcode encoded with a transaction identification identifying the transaction.

12. The method of claim 11, wherein the second digital image is further coded to display a call identification identifying the call to action.

13. The method of claim 6, further comprising displaying, on a consumer-facing screen of a point-of-sale system, the third digital image to a customer participating in a transaction performed at the point-of-sale system.

14. The method of claim 13, wherein the obtaining the second digital image comprises obtaining the second digital image coded to display a two-dimensional barcode as the second content.

15. The method of claim 14, wherein the first content includes a call to action related to scanning the two-dimensional barcode.

16. The method of claim 15, wherein the obtaining the second digital image further comprises obtaining the second digital image coded to display the two-dimensional barcode encoded with a transaction identification identifying the transaction.

17. The method of claim 16, wherein the second digital image is further coded to display a call identification identifying the call to action.

18. The method of claim 17, wherein the displaying comprises displaying the third digital image on a screen of a card reader.

19. A method for embedding an image, the method comprising:
   obtaining a first digital image coded to display a call to action and a placeholder occupying a specific position with respect to the call to action;
   storing, within a computer memory system, the first digital image;
   interpreting, by a computer processing system operably connected to the computer memory system, the first digital image to collect data identifying the specific position of the placeholder with respect to the call to action;
   obtaining a second digital image coded to display a two-dimensional barcode;
   using, by the computer processing system, the data to generate a third digital image coded to display the call to action and the two-dimensional barcode conspicuously, the two-dimensional barcode occupying the specific position with respect to the call to action; and
   storing, within the computer memory system, the third image.

20. A method for embedding an image during a transaction at a point-of-sale system, the method comprising:
   obtaining a first digital image coded to display a call to action and a placeholder occupying a specific position with respect to the call to action;
   storing, within memory associated with the point-of-sale system, the first digital image;
   interpreting, by a computer processing system operably connected to the memory, the first digital image to collect data identifying the specific position of the placeholder with respect to the call to action;
   obtaining a second digital image coded to display a two-dimensional barcode encoded with a transaction identification unique to the transaction;
   using, by the computer processing system, the data to generate a third digital image coded to display the call to action and the two-dimensional barcode conspicuously, the two-dimensional barcode occupying the specific position with respect to the call to action;
   storing, within the memory, the third image; and displaying the third image to a customer associated with the transaction via at least one of a receipt printed by the point-of-sale system and a customer-facing screen of the point-of-sale system.

* * * * *